US010342225B2

(12) United States Patent
Umezawa (10) Patent No.: US 10,342,225 B2
(45) Date of Patent: Jul. 9, 2019

(54) DOUBLE BEARING REEL (71) Applicant: GLOBERIDE, Inc., Tokyo (JP)

(72) Inventor: Yuuichi Umezawa, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/726,658

(22) Filed: Oct. 6, 2017

(65) Prior Publication Data
US 2018/0116194 A1 May 3, 2018

(30) Foreign Application Priority Data

Oct. 31, 2016 (JP) .................................. 2016-213460

(51) Int. Cl.
*A01K 89/01* (2006.01)
*A01K 89/015* (2006.01)

(52) U.S. Cl.
CPC ............................ *A01K 89/01921* (2015.05)

(58) Field of Classification Search
CPC .................. A01K 89/015; A01K 89/01921
See application file for complete search history.

(56) References Cited

U.S. PATENT DOCUMENTS

| 5,429,318 | A | * | 7/1995 | Sato | A01K 89/01916 242/314 |
| 5,577,680 | A | * | 11/1996 | Ikuta | A01K 89/01922 242/313 |
| 5,873,535 | A | * | 2/1999 | Jeung | A01K 89/01923 242/314 |
| 6,367,726 | B1 | * | 4/2002 | Hyon | A01K 89/01923 242/314 |
| 8,235,320 | B2 | * | 8/2012 | Kawasaki | A01K 89/0192 242/310 |
| 9,198,407 | B2 | * | 12/2015 | Hyun | A01K 89/015 |
| 9,642,348 | B2 | * | 5/2017 | Niitsuma | A01K 89/015 |
| 9,918,458 | B2 | * | 3/2018 | Umezawa | A01K 89/0192 |
| 2005/0056716 | A1 | * | 3/2005 | Kawasaki | A01K 89/00 242/310 |
| 2005/0224617 | A1 | | 10/2005 | Nakagawa et al. | |

(Continued)

FOREIGN PATENT DOCUMENTS

JP 2005-323586 A 11/2005
JP 2011-024527 A 2/2011

*Primary Examiner* — Emmanuel M Marcelo
(74) *Attorney, Agent, or Firm* — Pillsbury Winthrop Shaw Pittman, LLP (57) ABSTRACT

One object is to provide a double bearing reel capable of visually and accurately determining a releasable state of an opening/closing mechanism for releasing a frame by cover plates, the opening/closing mechanism being prevented from causing tangling of a fishing line. The double bearing reel has an opening/closing mechanism for enabling a cover plate on an opposite side to a handle to be opened/closed with respect to a frame. Said opening/closing mechanism includes an operation member for switching between a releasable state where the frame is releasable by the cover plate and a closed locked state where the frame is closed by the cover plate and an indication portion for indicating the releasable state. In tandem with a switching operation, the indication portion is exposed outside of a side plate in the releasable state and retracted inside of the side plate in the closed locked state.

11 Claims, 9 Drawing Sheets

(56) References Cited

U.S. PATENT DOCUMENTS

| | | | |
|---|---|---|---|
| 2013/0320125 A1* | 12/2013 | Hyun | A01K 89/01923 |
| | | | 242/312 |
| 2014/0110517 A1* | 4/2014 | Niitsuma | A01K 89/01555 |
| | | | 242/288 |
| 2016/0366866 A1* | 12/2016 | Sim | A01K 89/01921 |

* cited by examiner

DOUBLE BEARING REEL

CROSS-REFERENCE TO RELATED APPLICATIONS

This application is based on and claims the benefit of priority from Japanese Patent Application Ser. No. 2016-213460 (filed on Oct. 31, 2016), the contents of which are hereby incorporated by reference in their entirety.

TECHNICAL FIELD

The present invention relates to a double bearing reel in which a spool for winding a fishing line is rotatably supported between side plates of a reel body.

BACKGROUND

A typical double bearing reel includes left and right side plates including a frame and left and right cover plates (left and right cover members) removably attached to left and right sides of the frame, respectively. Between the left and right side plates, there is rotatably supported a spool for winding a fishing line. Upon a winding operation of a handle disposed on one of the side plates, the spool is driven to rotate to wind the fishing line. Between the frame and the cover plates, there are housed various functional components such as a drive force transmission mechanism for transmitting a rotational force of the handle to the spool and a brake force adjusting mechanism for adjusting a brake force imparted on the rotation of the spool. Since these functional components require maintenance or the like including mounting/removal of the spool (such as when replacing the spool or solving a trouble that a fishing line is pinched), an opening/closing mechanism is provided on the frame and the cover plates so as to enable the cover plates to be removed, as disclosed in, for example, Japanese Patent Application Publication Nos. 2005-323586 (hereinafter "the '586 Publication") and 2011-24527 (hereinafter "the '527 Publication").

The opening/closing mechanism is configured such that the cover plates can be released from the frame by operating an operation member such as a screw or a lever disposed on the cover plates. For example, the aforementioned '586 Publication discloses that a lever-type operation member is disposed on a lower rear portion of the side plate on an inner side of the frame on an opposite side to the handle, and the '527 Publication discloses that a dial screw-type operation member is disposed on a lower front portion of the cover plate on an opposite side to the handle.

The operation member of the opening/closing mechanism disclosed in each of the aforementioned '586 Publication and '527 Publication is turned between a release position and a closing position so as to switch between a releasable state where the frame is releasable by the cover plates (the cover plates can be removed from the frame) and a closed locked state where the frame is closed by the cover plates (removal of the cover plates from the frame is disabled). In the above-described '586 Publication, whether at the release position or at the closing position, the lever-type operation member remains to be positioned so as to be exposed on the lower rear portion on the inner side of the frame. Because of this, it can hardly be determined by appearance whether the operation member is at the release position or the closing position, and the operation member is brought close to a fishing line winding surface of the spool, so that it is likely that the fishing line becomes tangled around the operation member.

Similarly, also in the aforementioned '527 Publication, whether at the release position or at the closing position, the dial screw-type operation member remains to be projected to an outer peripheral region of the side plate on the lower front portion of the cover plate. Because of this, it can hardly be determined by appearance whether the operation member is at the release position or the closing position, and thus there may occur a trouble that a casting operation is erroneously performed when the operation member is at the release position, causing the cover plate to fall off from the frame.

Furthermore, in a fishing method using a double bearing reel, various operations are performed. For example, the side plate on the opposite side to the handle is gripped for a winding operation of the handle, or the side plate on a handle side or the opposite side to the handle is gripped for casting a tackle. When the side plate is gripped with a palm, the palm might hit a projection, resulting in occurrence of uncomfortable grip feeling. In order to prevent this, the operation member of the opening/closing mechanism is required not to be projected from a side surface of the cover plate. Actual fishing, however, involves various operation modes performed by gripping a reel body, and therefore, in some cases, various parts of fingers might accidentally contact the operation member. That is, when the reel body is gripped, a portion from the lower front portion to a rear side of the outer peripheral region of the side plate is contacted by various parts such as a tip, belly, or root of a finger. Therefore, in a case where the operation member of the opening/closing mechanism is disposed on this portion, there is a possibility that a sense of discomfort and uncomfortable grip feeling occur, a pain is felt, or a malfunction occurs in a gripping part of a palm or fingers.

SUMMARY

The present invention is intended to overcome the above-described problems and has as its object to provide a double bearing reel capable of visually and accurately determining a releasable state of an opening/closing mechanism where a frame is releasable by a cover plate, the opening/closing mechanism being prevented from causing a fishing line to become tangled. Furthermore, in addition thereto, it is also an object of the present invention to provide a double bearing reel including an opening/closing mechanism prevented from deteriorating grip feeling during actual fishing.

To achieve the above-described objects, the present invention is characterized in that a double bearing reel has: a reel body equipped with left and right side plates including a frame and cover plates openably/closably attached to the frame; a spool rotatably supported between the left and right side plates; a handle for driving the spool to rotate, the handle being provided on one of the left and right side plates; and an opening/closing mechanism for enabling one of the cover plates on an opposite side to the handle to be opened/closed with respect to the frame, the opening/closing mechanism being provided in the reel body. In the double bearing reel, the opening/closing mechanism is provided with: an operation member for switching between a releasable state where the frame is releasable by the cover plates and a closed locked state where the frame is closed by the cover plates; and an indication portion for indicating the releasable state. In tandem with a switching operation using the operation member between the releasable state and the closed locked state, the indication portion is exposed to an outer side of the other of the left and right side plates in the releasable state and retracted in an inner side of the other of the left and right side plates in the closed locked state.

As described above, the double bearing reel of the present invention is provided with the indication portion that indicates the releasable state of the opening/closing mechanism, where the frame is releasable by the cover plates. Upon switching using the operation member from the closed locked state to the releasable state, in tandem with the switching operation, the indication portion is exposed to an outer side of one of the side plates, and thus the releasable state of the opening/closing mechanism can be visually or haptically (because the indication portion contacts a hand holding the side plates mounted on the frame) determined with accuracy. Consequently, the frame is reliably released by the cover plates without causing an erroneous operation, and thus maintenance work or the like for various functional components housed in the frame can be easily and smoothly performed. Furthermore, upon switching using the operation member from the releasable state to the closed locked state, in tandem with the switching operation, the indication portion is retracted in an inner side of one of the side plates, and thus when the one of the side plates is gripped for operation during actual fishing, the indication portion is prevented from deteriorating grip feeling, and a fishing line is prevented from becoming tangled around the indication portion.

In the releasable state, it is only required that the frame be releasable by the cover plates, and any mounting mode may be adopted for mounting the cover places on the frame in the releasable state. For example, in the releasable state, the frame may be released in the following manner. That is, in a state where the cover plates remain to be unremovably mounted on the frame, one of the cover plates is moved relative to the frame by, for example, being turned with respect to the frame so that the frame is released. Or alternatively, the frame may be released by configuring the cover plates so that they are removable from the frame in the releasable state. Accordingly, in this connection, in the above-described configuration, it may also be possible that the releasable state enables removal of the cover plates from the frame, and the closed locked state disables removal of the cover plates from the frame.

Furthermore, in the above-described configuration, various exposure modes are also possible for exposing the indication portion from one of the side plates in the releasable state. For example, it may also be possible that in the releasable state, the indication portion is exposed to an outer side of one of the side plates through an opening formed in a corresponding one of the cover plates, and in the closed locked state, the indication portion is retracted in an inner side of the one of the side plates so as to be retracted from the opening (the indication portion becomes unseen through the opening). Or alternatively, it may also be possible that in the releasable state, the indication portion is visibly projected radially outward of an outer peripheral region of one of the side plates, and in the closed locked state, the indication portion is retracted in an inner side of the one of the side plates.

Furthermore, preferably, in the above-described configuration, an opening portion is formed in a side surface of one of the side plates on the opposite side to the handle, and the operation member of the opening/closing mechanism for the one of the side plates is disposed within the opening portion. According to such a configuration, even when the one of the cover plates is gripped for operation, no sense of discomfort is produced by the operation member. That is, as described above, the operation member is disposed within the opening portion so as not to be exposed or projected from a lower edge area or an upper edge area of the outer peripheral region of one of the cover plates. Therefore, the operation member is prevented from being contacted by a gripping part of a palm or fingers, and it is also prevented that uncomfortable grip feeling occurs, a pain is felt, or a malfunction occurs. Furthermore, the operation member lies within the opening portion, and thus a fishing line is prevented from becoming tangled around the operation member.

Furthermore, in the above-described configuration, it may also be possible that the indication portion is operable to switch between the releasable state and the closed locked state. In such a case, an auxiliary switching operation between the releasable state and the closed locked state can be performed by using the indication portion in place of the operation member, which is advantageous in a case where there is difficulty in operating the operation member due to how a reel is gripped. Furthermore, in this case, preferably, the indication portion has a finger retainer for a switching operation so that operability thereof is improved.

ADVANTAGES

According to the present invention, there is obtained a double bearing reel capable of visually or haptically determining, with accuracy, a releasable state of an opening/closing mechanism for releasing a frame by cover plates, thus capable of avoiding occurrence of an unnecessary trouble, the opening/closing mechanism being prevented from causing a fishing line to become tangled. Furthermore, according to the present invention, there is also obtained a double bearing reel including an opening/closing mechanism prevented from deteriorating grip feeling during actual fishing.

DESCRIPTION OF THE PREFERRED EMBODIMENTS

With reference to FIG. 1 to FIGS. 6A and 6B, the following describes one embodiment of a double bearing reel according to the present invention.

In a double bearing reel according to this embodiment, a reel body 1 is provided with a left side plate 1A, a right side plate 1B, and a spool 3 rotatably supported between the side plates 1A and 1B. In this embodiment, a handle 5 is provided on a right side plate 1B side. When the handle 5 is rotated for a winding operation, the spool 3 is driven to rotate via a drive force transmission mechanism (not shown) disposed inside the right side plate 1B (a right handle type). It may also be possible that the handle 5 is provided on a left side plate 1A side.

The left and right side plates 1A and 1B of the reel body 1 are formed of a frame 7 (7A, 7B) and cover plates 8 (8A, 8B) attached to the frame 7. Specifically, the frame 7 includes a left frame 7A and a right frame 7B, which are formed integrally with each other. The left frame 7A has a left cover plate 8A (a left cover member) attached thereto, and the right frame 7B has a right cover plate 8B (a right cover member) attached thereto. That is, the left side plate (a side plate on an opposite side to the handle) 1A is composed of the left frame 7A and the left cover plate 8A attached thereto, and the right side plate (a side plate on a handle side) 1B is composed of the right frame 7B and the right cover plate 8B attached thereto.

The frame 7 is provided with a plurality of connection portions that connect the left frame 7A to the right frame 7B, such as, for example, a front connection portion 7C, a rear connection portion 7D, an upper connection portion (which may serve also as a thumb rest) 7E, and a lower connection portion 7F. Of these connection portions, the lower connection portion 7F provided below the spool has a reel leg 9 mounted integrally thereto (it may also be possible that the reel leg 9 is formed integrally with the frame 7). The reel leg 9 is mounted to a reel seat 70 of a fishing rod 100 (see FIGS. 7 and 8).

Figure 7:
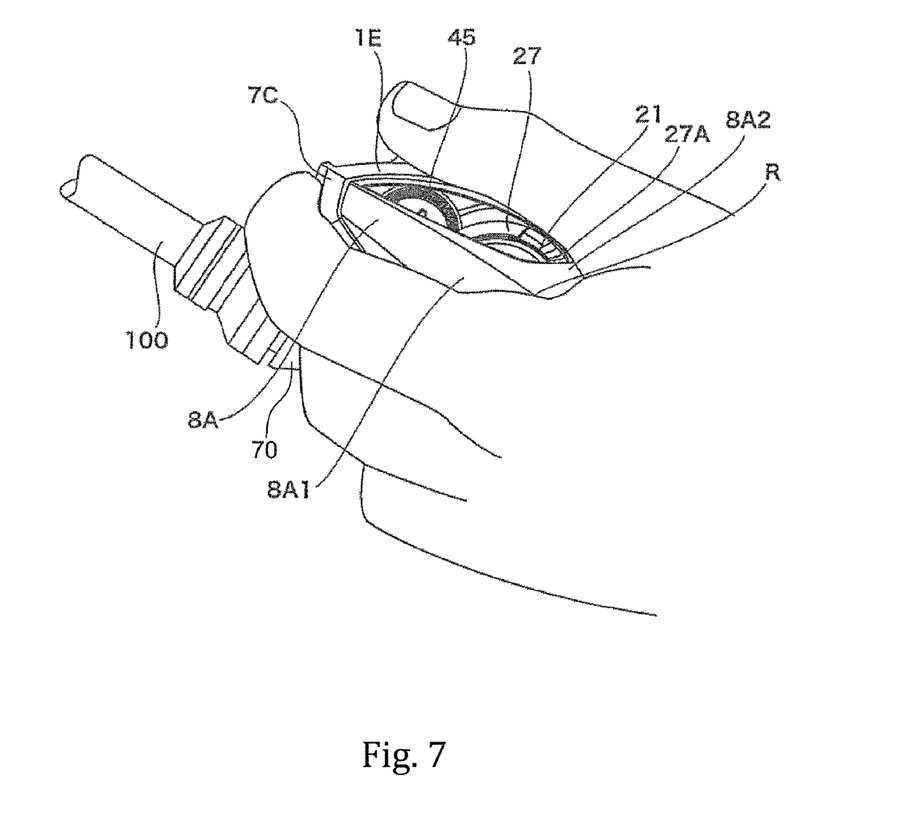
FIG. 7 is a view showing a state where the cover plate on the opposite side to the handle is gripped with a left hand.

Shapes of the left and right side plates 1A and 1B are not limited. In this embodiment, the left and right side plates 1A and 1B have a non-circular shape (a substantially oval shape) with its outer periphery extending in a front-rear direction as viewed from a side (see FIG. 2). In this case, a surface (a side surface) of the left side plate 1A (the left cover plate 8A) on the opposite side to the handle is a curved surface convex outward (in an axial direction of a spool shaft) such that the left side plate 1A can be easily wrapped in and gripped with a palm. In a vertically middle portion of the left side plate 1A, a ridge R is formed to define a peaked portion of the curved surface along the front-rear direction. In this case, the left side plate 1A is set to have a front-rear length L of 65 mm to 75 mm and a height (a maximum height) H of 35 mm to 45 mm such that it can be gripped easily, though these values vary depending on a size of a palm of a user. That is, as shown in FIG. 7, a belly of a forefinger is put on a region (a lower side surface 8A1) below the ridge R that constitutes the peaked portion of the curved surface, and a belly of a thumb is put on an upper edge portion 1E (a surface region) of the left side plate. The left side plate 1A as a whole, therefore, has such a shape that it can be easily gripped with a palm of a left hand.

Figure 2:
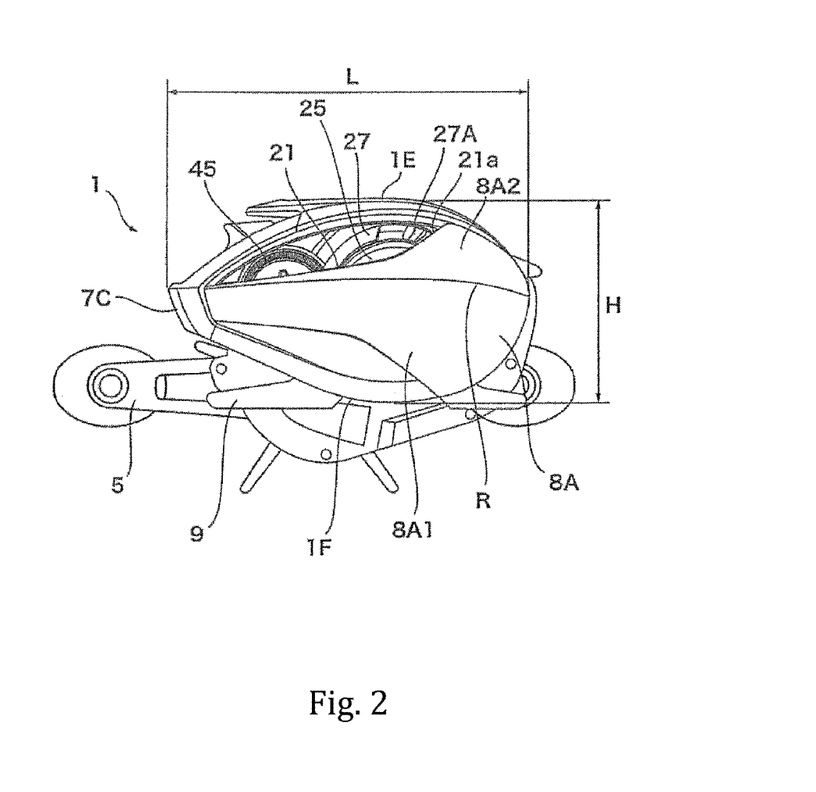
FIG. 2 is a side view of the double bearing reel shown in FIG. 1 as viewed from a side opposite to a handle thereof (a closed locked state of an opening/closing mechanism).
Figure 3:
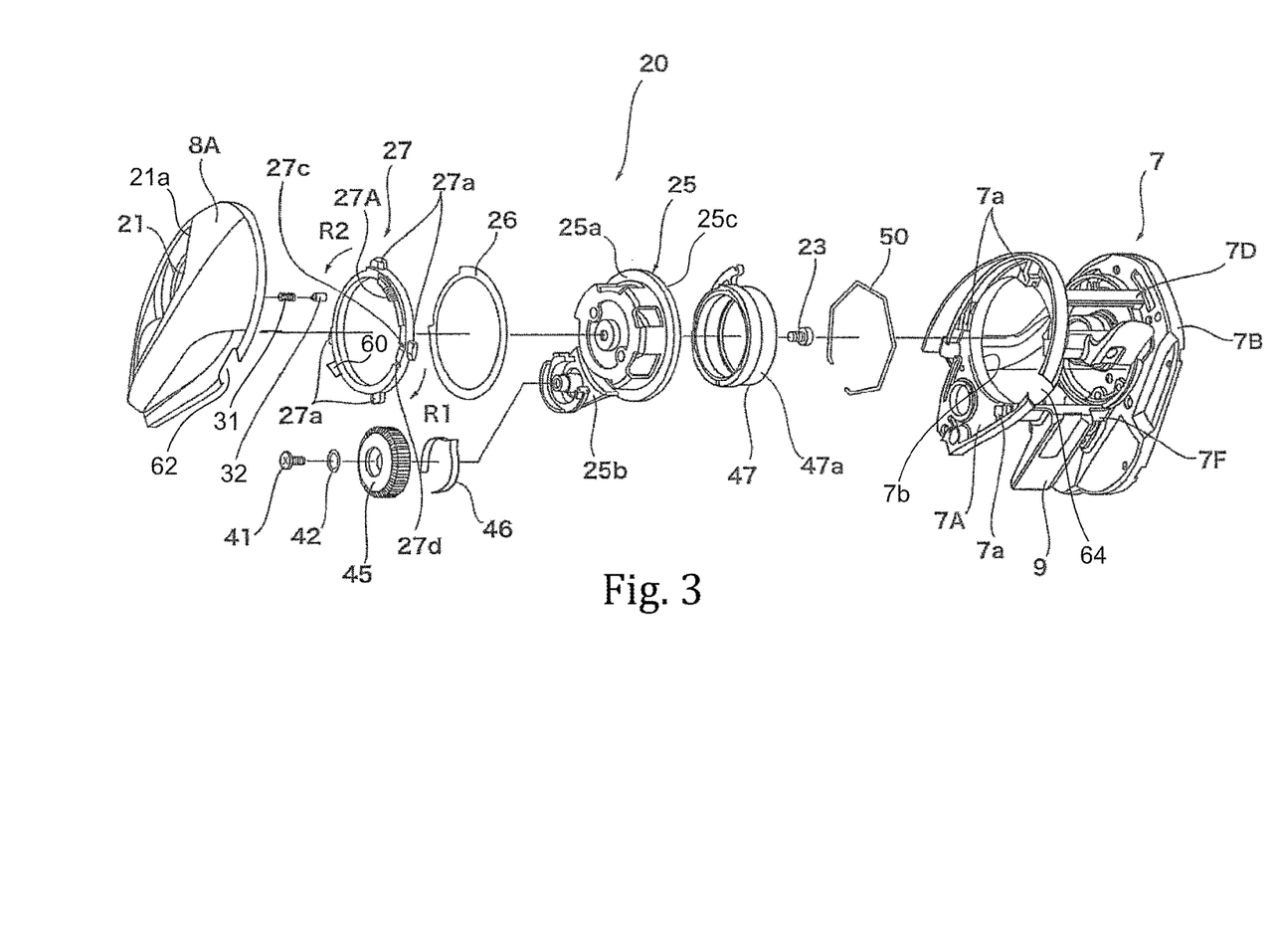
FIG. 3 is an exploded perspective view showing one example of the opening/closing mechanism.

Preferably, outer peripheral surfaces (the upper edge portion 1E, a lower edge portion 1F) of the left side plate 1A configured as above are each formed as a flat surface. A flat surface refers to a surface including no portions partially projected from the surface (refers to a flat-shaped surface having no exposed projections such as an after-mentioned operation member of an opening/closing mechanism, the surface including a curved surface). Since the side plate has flat outer peripheral surfaces as described above, the side plate gripped with a palm is prevented from catching fingers thereon, thus avoiding producing uncomfortable grip feeling. In this embodiment, when the reel body 1 is gripped with a left hand, a portion of a palm adjacent to roots of fingers contacts a rear-side region of the left cover plate 8A, and a belly of a forefinger contacts the region below the ridge R (the lower side surface 8A1), as shown in FIG. 2 and FIG. 7. At the same time, a belly of a thumb contacts the upper edge portion 1E of the left side plate 1A, and a middle finger, a ring finger, and a little finger contact the lower edge portion 1F of the left side plate 1A.

The reel body 1 includes an opening/closing mechanism 20 that enables the left cover plate 8A to be opened/closed with respect to the left frame 7A. For example, in this embodiment, the opening/closing mechanism 20 includes an operation member 27A disposed in such a position that it can be operated with a finger. The operation member 27A is operated to establish a releasable state so that the left cover plate 8A can be removed from the left frame 7A to expose the interior. The opening/closing mechanism 20 is disposed between the left frame 7A and the left cover plate 8A. It is only required, however, that the opening/closing mechanism 20 enable the frame to be released by the cover plate, and any mounting mode may be adopted to mount the cover plate 8A on the frame 7A when in the releasable state. For example, in the releasable state, the frame 7A may be released in the following manner. That is, in a state where the cover plate 8A remains to be unremovably mounted on the frame 7A, the cover plate 8A is moved relative to the frame 7A by, for example, being turned with respect to the frame 7A so that the frame 7A is released. The opening/closing mechanism 20 of this embodiment will be described below with reference to FIG. 2 and FIG. 3.

The left cover plate 8A has an opening portion 21 formed in a side surface thereof, and the operation member 27A of the opening/closing mechanism 20 is disposed within the opening portion 21 so as to be displaceable. The opening portion 21 is formed through the left cover plate 8A. In this embodiment, the opening portion 21 has an elongated shape and extends along the front-rear direction in a region above half the height H of the left cover plate 8A. In this embodiment, the left cover plate 8A has the ridge R in the side surface thereof, as mentioned above. The opening portion 21 is formed above the ridge R (in a region of an upper side surface 8A2).

Furthermore, the opening/closing mechanism 20 has a unit structure and is mounted on an inner surface of the left cover plate 8A. The opening/closing mechanism 20 is provided with a set plate 25 and a turning member 27. The set plate 25 is attached and fixed on the inner surface of the left cover plate 8A with a screw member 23. The turning member 27 has a ring shape and is mounted on a zone-ring surface 25a of the set plate 25 on a left cover plate 8A side via a washer 26. Furthermore, a circular outer peripheral portion 25c formed on the set plate 25 attached integrally to an inner side of the left cover plate 8A is fitted to a spool fitting inner peripheral portion 7b of the left frame 7A. The circular outer peripheral portion 25c and the spool fitting inner peripheral portion 7b are fittably attached to each other in a state where an outer peripheral shape of the non-circular left frame 7A is aligned with an outer peripheral shape of the left cover plate 8A.

The turning member 27 includes engagement pieces 27a that can be engaged with and disengaged from the left frame 7A. Specifically, a plurality of radially projecting projections 27a as the engagement pieces are formed at predetermined intervals on an outer peripheral surface of the turning member 27 (in this embodiment, four projections 27a are formed at angular intervals of 90° along a circumferential direction). These projections 27a are formed so as to be insertable into four recessed grooves 7a formed in the left frame 7A. That is, when the turning member 27 turns in one direction (a direction R1 in FIG. 3), the projections 27a are inserted into the associated recessed grooves 7a so as to fix the turning member 27 (accordingly, the left cover plate 8A on which the turning member 27 is fixed) on the left frame 7A. When the turning member 27 turns in the other direction (a direction R2 in FIG. 3), the projections 27a are disengaged from the associated recessed grooves 7a so as to unfix the turning member 27 (accordingly, the left cover plate 8A on which the turning member 27 is fixed) from the left frame 7A.

On the left cover plate 8A side of the turning member 27, there is formed the operation member 27A that has a lever-like shape and is projected toward the opening portion 21. The operation member 27A can be pressed with a finger (or pinched with fingers) to turn the turning member 27. In a state where the set plate 25 is fastened integrally on the left cover plate 8A with the screw member 23, the operation member 27A is positioned within the opening portion 21 formed in the left cover plate 8A.

In the above-described configuration, the turning member 27 is integrated with the set plate 25 into a unit. The screw member 23 is screwed into a central portion of the set plate 25 from inside so as to fix the set plate 25 integrally on the inner surface of the left cover plate 8A and enables the turning member 27 to be turned. That is, when the operation member 27A formed on the turning member 27 is turned (moved in the front-rear direction), the turning member 27 can be displaced circumferentially with respect to the set plate 25 and the left cover plate 8A in a state of being fixed together.

Preferably, a positioning means for setting a turning position is provided on the turning member 27. The positioning means can be composed of, for example, two recesses 27c and 27d and an engagement pin 32. The two recesses 27c and 27d are formed along the circumferential direction on the left cover plate 8A side of the turning member 27, and the engagement pin 32 is disposed in a sack hole (not shown) formed in the inner surface of the left cover plate 8A via a pressing spring 31. Specifically, the recesses 27c and 27d are positioned so as to correspond to positions where the projections 27a formed on the outer peripheral surface are inserted into or disengaged from the recessed grooves 7a in the left frame 7A as the turning member 27 is turned by operating the operation member 27A. The engagement pin 32 is biased elastically into the recesses 27c and 27d at these positions and engaged therewith. That is, the positioning means can set with click-stops the positions where the projections 27a of the turning member 27 are inserted into or disengaged from the associated recessed grooves 7a.

Figure 5:
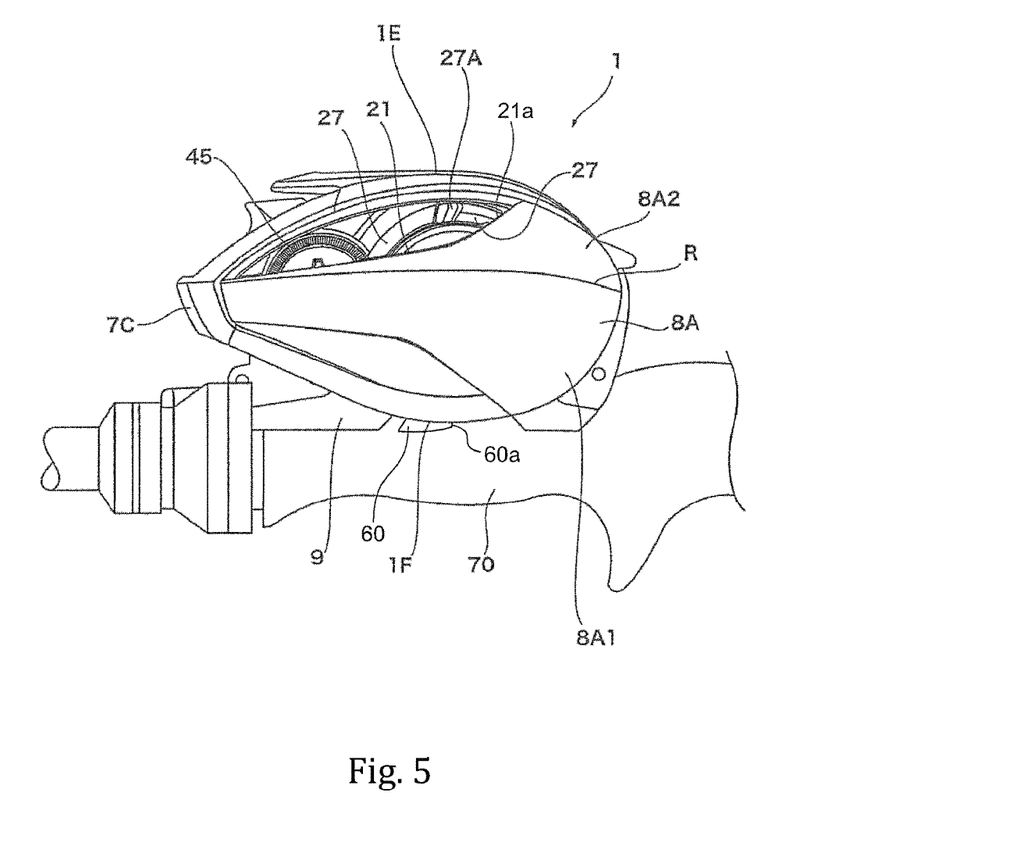
FIG. 5 is a side view of the double bearing reel shown in FIG. 1 as viewed from the side opposite to the handle thereof (a releasable state of the opening/closing mechanism).

By the above-described configuration, when the operation member 27A of the turning member 27 is moved frontward in the direction R2 so as to position at the recess 27d the engagement pin 32 having been engaged with the recess 27c, the projections 27a of the turning member 27 are disengaged from the associated recessed grooves 7a, and the left cover plate 8A with the set plate 25 incorporated thereinto becomes removable from the left frame 7A (the releasable state where the left frame 7A is releasable by the left cover plate 8A; see FIG. 5). Furthermore, in a state where the left cover plate 8A is positioned at a predetermined position on the left frame 7A, and the operation member 27A of the turning member 27 is moved rearward in the direction R1 such that the engagement pin 32 is inserted into the recess 27c for positioning, the projections 27a of the turning member 27 are engaged with the associated recessed grooves 7a, and thus the left cover plate 8A is mounted on the left frame 7A (the closed locked state where the left frame 7A is closed by the left cover plate 8A; see FIG. 2). That is, removal of the left cover plate 8A from the left frame 7A is disabled.

Preferably, when the operation member 27A of the turning member 27 is moved rearward for positioning, the operation member 27A is in such a positional relationship as to be adjacent to a rear end edge 21a of the opening portion 21. A palm and fingers of a hand holding the cover plate 8A are less likely to contact a region near the rear end edge 21a. Therefore, the operation member 27A in the closed locked state is positioned in this region so that a possibility of accidental unlocking of the closed locked state can be reduced. That is, compared with a configuration in which the operation member 27A is moved frontward to establish the closed locked state, the possibility of accidental unlocking of the closed locked state while the reel is operated (held) is reduced.

Figure 1:
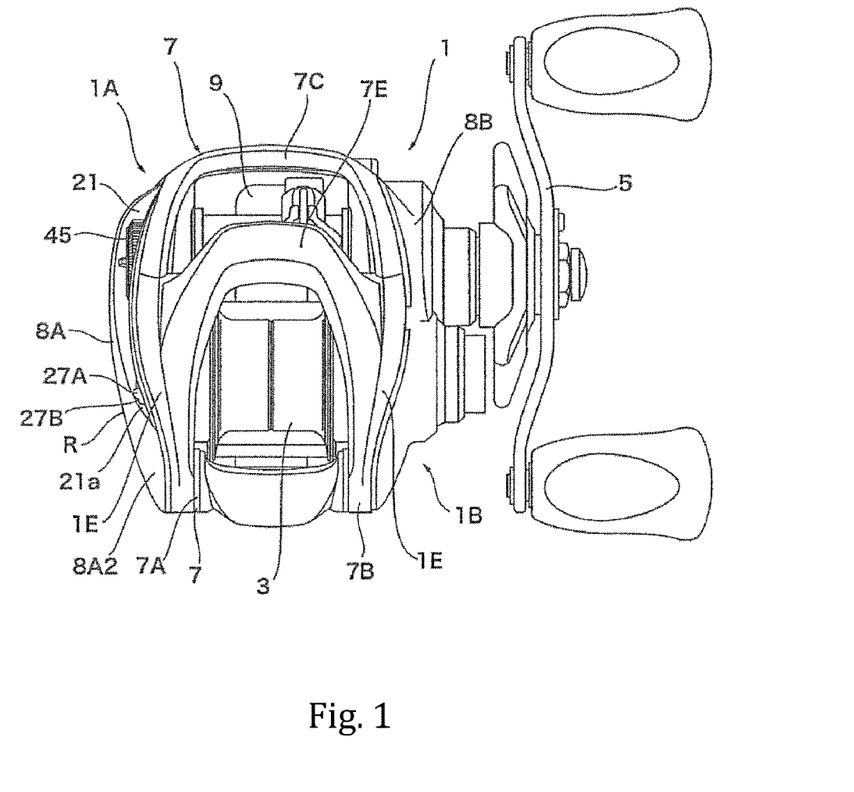
FIG. 1 is a plan view showing one embodiment of a double bearing reel according to the present invention.
Figure 4:
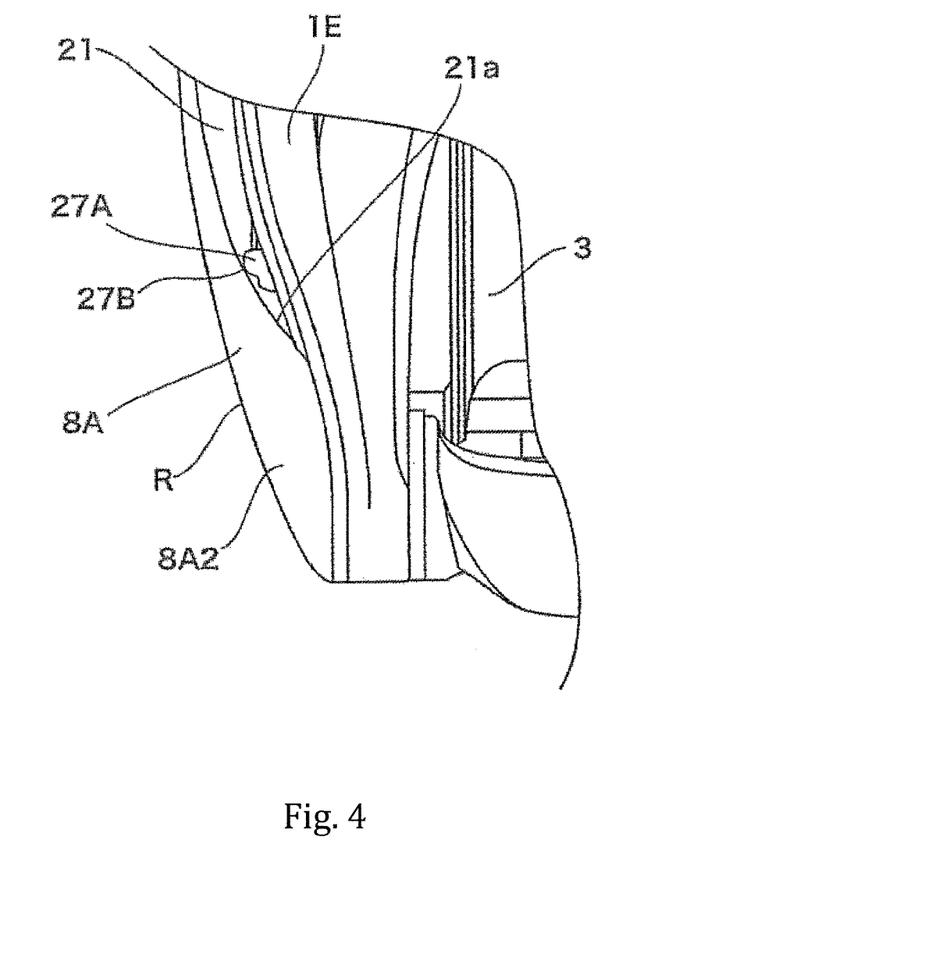
FIG. 4 is a plan view of a cover plate on the opposite side to the handle as viewed from a rear side.

Furthermore, preferably, the operation member 27A configured as above is formed to have a stepped shape to facilitate a moving operation. More specifically, the operation member 27A includes a step 27B (see FIG. 4) projecting more on its front side than on its rear side. In this case, the step 27B easily catches a finger pressing it from a rear side and facilitates an operation of unlocking the closed locked state. Furthermore, as mentioned earlier, the operation member 27A is positioned within the opening portion 21. The opening portion 21 of this embodiment is formed in a dead space (in a region of the upper side surface 8A2) scarcely contacted by fingers or the like of a hand actually holding the left cover plate 8A during actual fishing (see FIG. 8). Therefore, as shown in FIG. 1 and FIG. 4, a distal end (a surface of a peaked portion) 27B of the operation member 27A positioned within the opening portion 21 can also be either flush with or slightly beyond the surface of the left cover plate 8A (a surface of the upper side surface 8A2). Even when the operation member 27A is slightly projected beyond the surface, there is a less possibility of an erroneous operation because the operation member 27A is positioned in a dead space. In an actual operation, the operation member 27A slightly projected beyond the surface is easily pressed with a finger (or pinched with fingers), and thus operability in removing the left cover plate 8A can be improved.

In this case, preferably, the distal end (the surface of the peaked portion) 27B of the operation member 27A is set to be projected beyond the surface of the left cover plate 8A by 1.0 mm or less to reduce a possibility of occurrence of a sense of discomfort or an erroneous operation when a palm wraps the entirety of the left cover plate 8A.

In this embodiment, a brake mechanism for applying a brake force to rotation of the spool 3 is provided on the set plate 25. A configuration of the brake mechanism is not particularly limited. For example, the brake mechanism can be formed based on magnetic braking for applying a brake force to rotation of the spool shaft of the spool 3, as disclosed in Japanese Patent Application Publication No. 2011-10579. Such a brake mechanism based on the magnetic braking is well known, and details thereof, therefore, will be herein omitted. Similarly to the configuration disclosed in the above-described publication, the brake mechanism is provided with an adjuster 45, a leaf spring 46, a magnet holder 47, and so on. The adjuster 45 is rotatably supported on a front extending portion 25b of the set plate 25 via a fastening screw 41 and a washer 42 so as to be disposed within the opening portion 21. The leaf spring 46 produces a click sound when the adjuster 45 is rotated. The magnet holder 47 is driven to rotate via an interlocking gear (not shown) when the adjuster 45 is rotated.

The set plate 25 has a first annular magnet (not shown) mounted thereon, and the magnet holder 47 has a second annular magnet 47a mounted thereon. The second annular magnet 47a is opposed to the first annular magnet with a predetermined annular gap provided therebetween. Furthermore, an annular electric conductor (not shown) that rotates integrally with the spool 3 is fixed on the spool shaft. This annular electric conductor is disposed in the annular gap between the first annular magnet and the second annular magnet 47a. When the adjuster 45 is rotated, relative positions of the first annular magnet and the second annular magnet 47a are varied, thereby steplessly varying an intensity of a magnetic field in the annular gap and adjusting a brake force applied to the electric conductor (the spool) positioned in the annular gap. The magnet holder 47 incorporated into the set plate 25 is fixed on the set plate 25 with a retaining ring 50 so as not to come off.

A position of the adjuster 45 of the brake mechanism configured as above is not particularly limited. In view of a positional relationship with the opening/closing mechanism 20, preferably, as in this embodiment, the adjuster 45 is positioned on a front side of the opening portion 21, and the operation member 27A of the opening/closing mechanism 20 is positioned on a rear side of the opening portion 21. That is, preferably, the adjuster 45 of the brake mechanism, which may be operated during actual fishing, is disposed on the front side of the opening portion 21 so as to be easily contacted and rotated with a forefinger of a left hand holding the side plate, while the operation member 27A of the opening/closing mechanism 20, which may not be operated during actual fishing, is disposed on the rear side so as not to be easily reached by fingers.

Figure 6A:
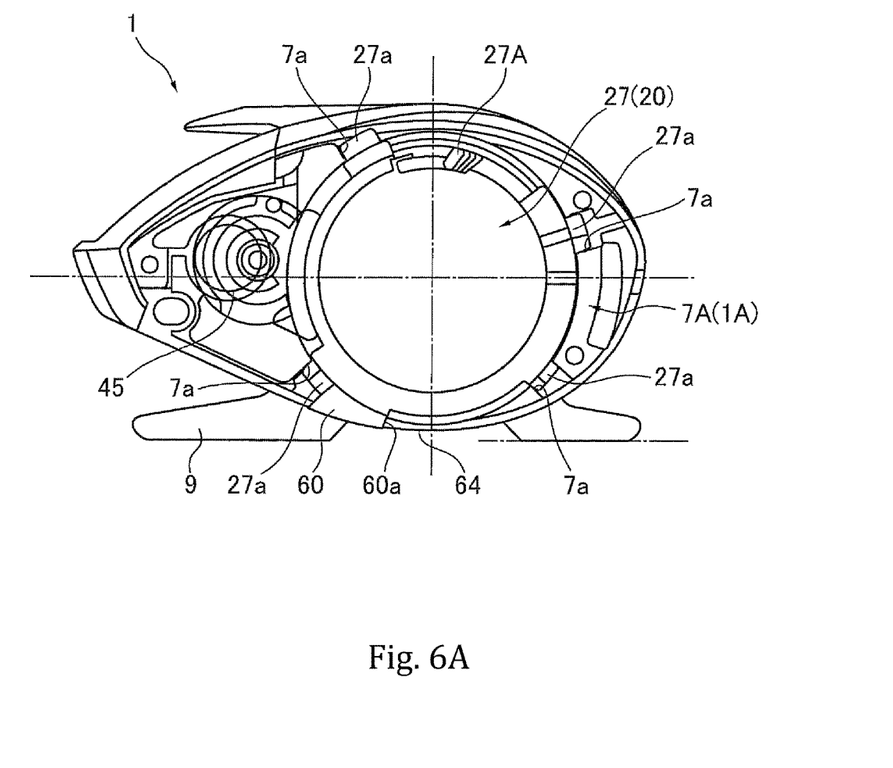
FIG. 6A is a diagrammatic, schematic side view of the double bearing reel showing a position of an indication portion in the closed locked state of the opening/closing mechanism.
Figure 6B:
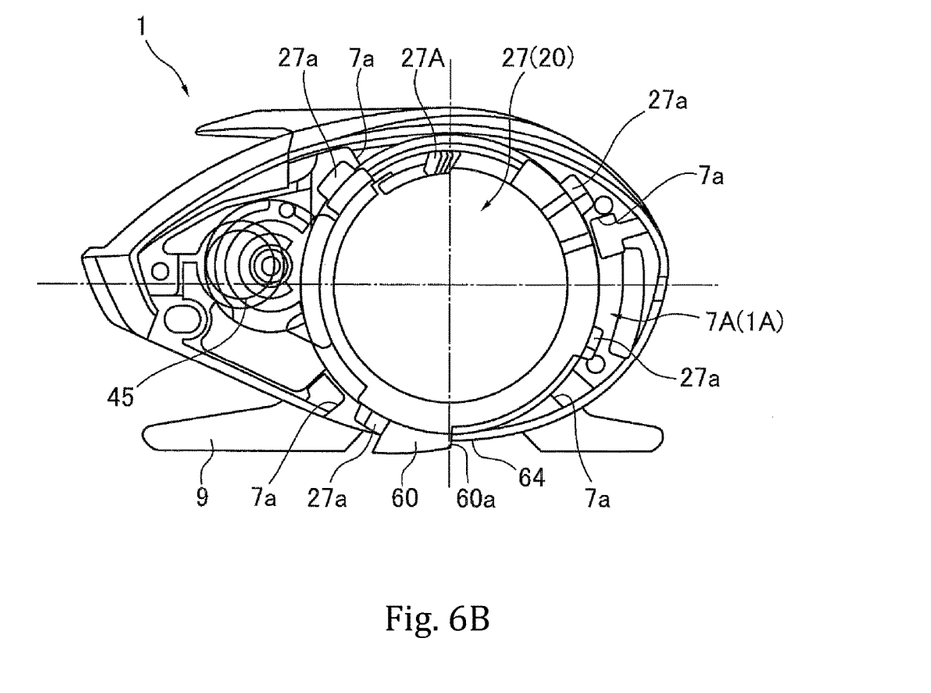
FIG. 6B is a diagrammatic, schematic side view of the double bearing reel showing a position of the indication portion in the releasable state of the opening/closing mechanism.

Furthermore, the opening/closing mechanism 20 of this embodiment is provided further with an indication portion 60 for indicating the aforementioned releasable state of the opening/closing mechanism 20. In this embodiment, the indication portion 60 is provided as a projection formed on the outer peripheral surface of the turning member 27 so as to be projected radially outward. In this case, in the releasable state where the operation member 27A of the turning member 27 is moved frontward in the direction R2, and thus the projections 27a of the turning member 27 are disengaged from the associated recessed grooves 7a, as shown in FIG. 5 and FIG. 6B, the indication portion 60 is exposed to an outer side of the left side plate 1A through an opening 62 (see FIG. 3) formed in an outer peripheral edge portion of the left cover plate 8A and a cut 64 (see FIG. 3) formed in an outer peripheral edge portion of the left frame 7A. That is, the indication portion 60 is visibly projected radially outward of an outer peripheral region of the left side plate 1A, thus visually indicating to a reel user (a fisherman) that the releasable state is established. On the other hand, in the closed locked state where the operation member 27A of the turning member 27 is moved rearward in the direction R1, and thus the projections 27a of the turning member 27 are engaged with the associated recessed grooves 7a, as shown in FIG. 2 and FIG. 6A, the indication portion 60 is retracted radially inward of the outer peripheral region of the left side plate 1A. That is, a position, a shape, a size, a projecting amount of the indication portion 60 are appropriately set such that the indication portion 60 is retracted within an inner space between the left cover plate 8A and the left frame 7A. Preferably, a projecting amount of the indication portion 60 is set to be 1.5 mm or less. When used as an operation portion, however, the indication portion 60 is set to be projected to some degree (0.5 mm to 1.5 mm) from the outer peripheral region of the left side plate 1A so that excellent operability in pressing in the indication portion 60 is obtained.

That is, in this embodiment, in tandem with a switching operation using the operation member 27A between the releasable state and the closed locked state, below the opening portion 21, the indication portion 60 is projected/retracted with respect to an outer peripheral edge of the left side plate 1A. However, a projection/burial mode of the indication portion 60 is not limited thereto. For example, it may also be possible that in the releasable state, the indication portion 60 is exposed to an outer side of the left side plate 1A through an opening (not shown) formed in the left cover plate 8A, and in the closed locked state, the indication portion 60 is retracted in an inner side of the left side plate 1A so as to be retracted from the opening (the indication portion 60 becomes unseen through the opening).

Furthermore, the indication portion 60 of this embodiment is formed integrally with the turning member 27 having the operation member 27A, and thus the indication portion 60 itself can also switch between the releasable state and the closed locked state. Therefore, in this embodiment, in order to improve operability of the indication portion 60, the indication portion 60 has a finger retainer 60a for a switching operation. Specifically, in this embodiment, the indication portion 60 is formed in a substantially triangular shape, and a rear end surface thereof facing an opposite direction to the direction R1 (may have the same shape as that of the step 27B of the operation member 27A) is used as the finger retainer 60a.

In this embodiment, since the handle 5 is provided on the right side plate 1B side, the left cover plate 8A on the opposite side to the handle is formed so as to be openable/closable by the opening/closing mechanism 20 with respect to the left frame 7A. In a case, however, where the handle 5 is provided on the left side plate 1A side, needless to say, the right cover plate 8B on the handle side is formed so as to be openable/closable by the opening/closing mechanism 20 with respect to the right frame 7B.

As discussed above, the double bearing reel of this embodiment is provided with the indication portion 60 that indicates the releasable state of the opening/closing mechanism 20, where the left frame 7A is releasable by the left cover plate 8A. Upon switching using the operation member 27A from the closed locked state to the releasable state, in tandem with the switching operation, the indication portion 60 is exposed to the outer side of the left side plate 1A, and thus the releasable state of the opening/closing mechanism 20 can be visually or haptically determined with accuracy. Consequently, the left frame 7A is reliably released by the left cover plate 7A without causing an erroneous operation, and thus maintenance work or the like for various functional components housed in the frame 7 can be easily and smoothly performed.

In a state where the left cover plate 8A is mounted on the left frame 7A, the indication portion 60 is projected from the outer peripheral region of the left side plate 1A, and thus it can be visually understood with ease that the releasable state is established. Thus, even when an inadvertent attempt is made to shift to a casting operation (to switch to a spool free-rotation state by switching off a clutch mechanism), a hand holding the left side plate 1A in that state is contacted by the indication portion 60, and thus it can be haptically determined that the left cover plate 8A is in the releasable state. This can avoid occurrence of a trouble such as the left cover plate 8A falling off from the left frame 7A.

Furthermore, upon switching using the operation member 27A from the releasable state to the closed locked state, in tandem with the switching operation, the indication portion 60 is retracted in the inner side of the left side plate 1A, and thus when the left side plate 1A is gripped for operation during actual fishing, the indication portion 60 is prevented from deteriorating grip feeling, and a fishing line is prevented from becoming tangled around the indication portion 60.

Furthermore, in this embodiment, the indication portion 60 is operable to switch between the releasable state and the closed locked state. That is, an auxiliary switching operation between the releasable state and the closed locked state can be performed by using the indication portion 60 in place of the operation member 27A, which is advantageous in a case where there is difficulty in operating the operation member 27A due to how a reel is gripped. Furthermore, the indication portion 60 has the finger retainer 60a for a switching operation, and thus excellent operability of the indication portion 60 is obtained.

Furthermore, in this embodiment, the opening portion 21 is formed in the side surface of the left cover plate 8A on the opposite side to the handle, and the operation member 27A of the opening/closing mechanism 20 is disposed within the opening portion 21. Therefore, even when the left cover plate 8A is gripped for operation, no sense of discomfort is produced by the operation member 27A. That is, as described above, the operation member 27A is disposed within the opening portion 21 so as not to be exposed or projected from a lower edge area or an upper edge area of the outer peripheral region of the left cover plate 8A. Thus, the operation member 27A is prevented from being contacted by a gripping part of a palm or fingers, and it is also prevented that uncomfortable grip feeling occurs, a pain is felt, or a malfunction occurs. Furthermore, the operation member 27A lies within the opening portion 21, and thus a fishing line is prevented from becoming tangled around the operation member 27A.

Figure 8:
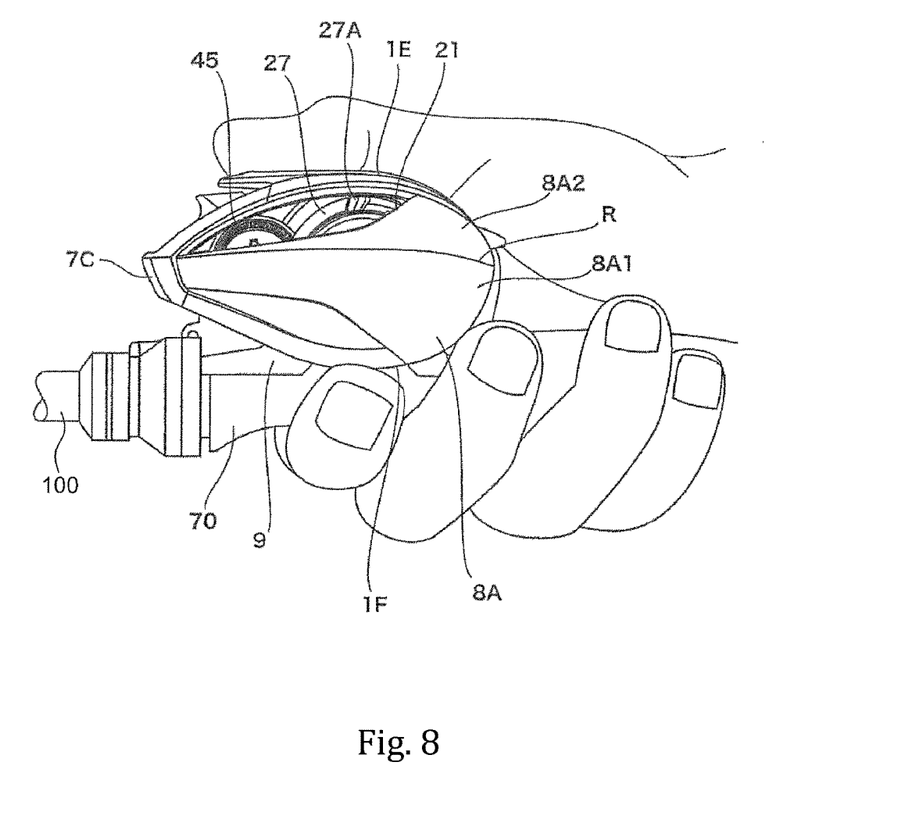
FIG. 8 is a view showing a state where a cover plate on a handle side is gripped with a right hand.

More specifically, when the left cover plate is held with a left hand as shown in FIG. 7, or when the right cover plate is held with a right hand as shown in FIG. 8, finger tips of the hand contact the upper edge portion 1E and the lower edge portion 1F constituting the flat surface region (the outer peripheral surface) of the side plate. In these portions, the operation member is not exposed, and flatness of the flat surface region prevents occurrence of a sense of discomfort, and further, it is prevented that a malfunction occurs due to contact of fingers.

Embodiments of the present invention are not limited to the above descriptions and are susceptible to various modifications within the purport of the present invention. For example, shapes of the cover plates included in the side plates are not particularly limited and may be circular, for example. Furthermore, a position and a shape of the opening portion formed in the cover plate are also not particularly limited. In this case, it may also be possible that the opening portion is formed in a region to be covered with a palm of a hand holding the side plate. In such a configuration, preferably, the operation member of the opening/closing mechanism is formed so as not to be projected from the side surface of the cover plate. Furthermore, while in the above descriptions, the opening portion is formed to extend through the cover plate, it may also be possible that a part of the opening portion has a bottom, and in that state, the opening portion extends through the cover plate, or the entirety of the opening portion has a bottom.

It may also be possible that the operation member of the opening/closing mechanism is operated against a biasing force, for example, instead of being a lever to be turned in the front-rear direction. Such a configuration facilitates unlocking, preferably, the peaked portion of the operation member disposed within the opening portion is positioned on an inner side with respect to a surface of the cover plate.

It may also be possible that only the operation member of the opening/closing mechanism is disposed within the opening portion formed in the cover plate. Furthermore, in this embodiment, the operation member may be either slid straightly in the front-rear direction or slid in a top-bottom direction. Further, the operation member positioned within the opening may be disposed in a position away from edge portions defining the opening portion, for example, in a middle region of the opening portion. Still further, it may also be possible that the operation member is a push button that can be operated within the opening portion.

Further, a shape, a projection/burial position, and so on of the indication portion of the opening/closing mechanism may also vary from those in the foregoing embodiment. The bottom line is, it is only required that the releasable state can be visually and reliably indicated by the indication portion in such a manner as not to interfere with operability of a reel.

What is claimed is:

1. A double bearing reel, comprising:
   a reel body equipped with left and right side plates including a frame and cover plates openably/closably attached to the frame;
   a spool rotatably supported about an axis between the left and right side plates;
   a handle for driving the spool to rotate about the axis, the handle being provided on one of the left and right side plates; and
   an opening/closing mechanism for enabling one of the cover plates on an opposite side to the handle to be opened/closed with respect to the frame, the opening/closing mechanism being provided in the reel body,
   wherein the opening/closing mechanism includes:
     an operation member for switching between a releasable state where the frame is releasable by the cover plates and a closed locked state where the frame is closed by the cover plates, the operation member being configured to switch between the releasable state and the closed locked state via rotation of the operation member about the axis; and
     an indication portion for indicating the releasable state, and
   in tandem with a switching operation using the operation member between the releasable state and the closed locked state, the indication portion is exposed to an outer side of the other of the left and right side plates and projects radially outward through an opening formed in the other of the left and right side plates in the releasable state and retracted in an inner side of the other of the left and right side plates in the closed locked state.

2. The double bearing reel according to claim 1, wherein the releasable state enables removal of the cover plates from the frame, and the closed locked state disables the removal of the cover plates from the frame.

3. The double bearing reel according to claim 1, wherein in the releasable state, the indication portion is visibly projected radially outward of an outer peripheral region of the other of the left and right side plates.

4. The double bearing reel according to claim 1, wherein the indication portion is operable to switch between the releasable state and the closed locked state.

5. The double bearing reel according to claim 4, wherein the indication portion has a finger retainer for a switching operation.

6. The double bearing reel according to claim 1, wherein an opening portion is formed in a side surface of the one of the cover plates on the opposite side to the handle, and the operation member of the opening/closing mechanism is disposed within the opening portion so as to be displaceable.

7. The double bearing reel according to claim 6, wherein the opening portion is formed in an upper portion of the one of the cover plates, and in tandem with a switching operation using the operation member, the indication portion is projected/retracted with respect to the other of the left and right side plates below the opening portion.

8. The double bearing reel according to claim 6, wherein the operation member further comprises a lever portion, wherein the lever portion is disposed within the opening portion and configured for displacement, and wherein displacement of the lever portion is configured to activate rotation of the operation member.

9. The double bearing reel according to claim 8, wherein the displacement of the lever portion is in a circumferential direction.

10. The double bearing reel according to claim 1, wherein the operation member includes a turning member or ring.

11. The double bearing reel according to claim 10, wherein the turning member or ring of the operation member has at least one radially projecting engagement piece that is insertable into a corresponding groove provided on the frame.

* * * * *